United States Patent [19]
Kracht et al.

[11] Patent Number: 5,099,611
[45] Date of Patent: Mar. 31, 1992

[54] WINDOW REGULATOR MECHANISM WITH KICK-OUT FEATURE

[75] Inventors: Thomas F. Kracht, St. Clair Shores; Jeffrey S. Lawrence, Warren, both of Mich.

[73] Assignee: Excel Industries, Inc., Elkhart, Ind.

[21] Appl. No.: 561,271

[22] Filed: Jul. 31, 1990

Related U.S. Application Data

[63] Continuation of Ser. No. 272,639, Nov. 17, 1988, abandoned.

[51] Int. Cl.⁵ ............................................. E05F 11/38
[52] U.S. Cl. ........................................ 49/211; 49/374
[58] Field of Search ................ 49/209, 210, 211, 213, 49/215, 216, 221, 361, 374, 375

[56] References Cited

U.S. PATENT DOCUMENTS

| | | | |
|---|---|---|---|
| 4,771,575 | 9/1988 | Tiesler | 49/211 |
| 4,785,582 | 11/1988 | Tokue et al. | 49/374 |
| 4,788,794 | 12/1988 | Miller | 49/211 |
| 4,793,099 | 12/1988 | Friese et al. | 49/374 |
| 4,829,711 | 5/1989 | Sambor | 49/211 |
| 4,905,412 | 3/1990 | Srock et al. | 49/375 |

FOREIGN PATENT DOCUMENTS

| | | | |
|---|---|---|---|
| 0507088 | 6/1939 | United Kingdom | 49/361 |
| 0597732 | 2/1949 | United Kingdom | 49/361 |

*Primary Examiner*—Gerald A. Anderson

[57] ABSTRACT

A window regulator mechanism for motor vehicle door assembly is disclosed having a kick-out feature for moving of the lower edge of the glass outward as the glass is moved upward into the upper position such that the lower edge of the glass can be positioned flush with the exterior surface of the vehicle. Three separate embodiments are disclosed for providing the kick-out feature in the window regulator mechanism. The window regulator combines both the window drive and guidance systems into one mechanism, reducing the number of components in the door assembly.

2 Claims, 6 Drawing Sheets

WINDOW REGULATOR MECHANISM WITH KICK-OUT FEATURE

This is a continuation of U.S. patent application Ser. No. 272,639, filed Nov. 17, 1988, now abandoned.

BACKGROUND AND SUMMARY OF THE INVENTION

This invention relates generally to a window regulator mechanism for a motor vehicle and more particularly to a dual drive window regulator mechanism which includes a kick-out feature to move the lower edge of the window glass outward as the glass reaches the raised position closing the window opening.

As automobile designs become more aerodynamic, vehicle designers are incorporating "four-side flush glass" in vehicle windows. In "four-side flush glass", the window glass is flush with the vehicle exterior along all four sides of the glass. In the past, vehicle side door windows have been constructed with window glass that slides in a guide channel extending from a window storage cavity beneath the window opening upward along the periphery of the window opening. When the glass is in the raised position closing the window opening, the exterior surface of the glass is recessed relative to the exterior surface of the vehicle door.

The window opening and glass guidance system with four-side flush glass is designed such that as the glass is raised to the upper position, the upper edge of the glass contacts and seals against the upper edge of the window opening flush with the vehicle exterior along the upper edge of the window opening. The difficulty, however, is with positioning of the lower edge of the glass flush to the vehicle exterior.

In order to lower the window into a storage cavity beneath the window opening, it is necessary for the door assembly to have an opening along the sill at the bottom edge of the window opening to allow the glass to move downward into the storage cavity. This opening into the storage cavity by necessity is inboard of the outer surface of the door.

In order to position the lower edge of the glass flush with the vehicle exterior, it is necessary to rotate the lower edge of the glass outward into a position flush with the vehicle door exterior. Rotation of the glass is not possible if the glass edges are contained in U-shaped glass guide channels. Previous kick-out mechanisms have relied on arms attached to the glass which are guided within guide channels to provide the rotational motion. A separated window regulator is provided for raising and lowering the glass. The regulator had to have additional components to allow the regulator to follow this outward travel of the glass. The result is additional components and weight in the vehicle door assembly. This type of kick-out mechanism is shown in U.S. Pat. No. 4,575,967, issued Mar. 18, 1986 to Bickerstaff.

Improvements in glass guidance systems have resulted in dual drive window regulator mechanisms which incorporate the glass guidance system into the regulator system thereby eliminating the need for separate glass guide channels as shown in copending patent application, commonly assigned, U.S. Ser. No. 07/272,640.

Accordingly it is an object of this invention to provide a kick-out mechanism for use with a window regulator which does not require use of a separate glass guide system.

The window regulator mechanism of this invention includes a dual drive system which drives the window glass at two points, one at the forward edge of the glass and the other at the rearward edge of the glass. The glass is driven by translating racks contained within stationary tracks. The regulator includes two racks, one connected to each drive point on the glass. Each track has a longitudinal slot along one side providing access to evenly spaced transverse teeth in the rack. The teeth of a drive pinion extend through the slots in the track and engage the teeth of the rack. As the pinion is rotated, the racks are simultaneously moved within the tracks to raise or lower the glass depending on the direction of rotation of the pinion. A mounting flange attached to the end of the rack in each track is used to connect the rack to the glass at the drive point.

In one embodiment, the attachment of the mounting flange to the glass includes a pair of sliding blocks. The mounting flange is attached to a lower dovetail sliding block which includes a dovetail shaped mortise along its upper surface. An upper dovetail block, having a corresponding dovetail tenon, is positioned above the lower block with the tenon engaged with the mortise. The mortise and tenon extend side-to-side relative to the vehicle door to allow the upper block to move outward as the glass is raised. A pin extending from the upper dovetail block engages a slotted cam as the glass approaches its upper position. The slotted cam urges the upper dovetail block outward moving the lower edge of the window glass flush with the vehicle exterior along the lower edge of the window opening.

In a second embodiment, the slotted cam is replaced with an inclined wedge which engages the upper dovetail block and urges it outward as the glass approaches the raised position.

In a third embodiment, a push rod extends inwardly from the glass through a rod guide attached to the mounting flange. A button is attached to the opposite end of the push rod by a ball and socket joint. The button has an annular groove around its periphery which engages a guide rail positioned generally parallel to the track. The upper end of the guide rail is inclined outward such that as the glass is raised, the button follows the incline in the guide rail and moves outward, thereby sliding the push rod through the rod guide, pushing the lower edge of the glass outward into a flush relationship with the door exterior surface.

Further objects, features and advantages of the invention will become apparent from a consideration of the following description and the appended claims when taken in connection with the accompanying drawings.

DESCRIPTION OF THE PREFERRED EMBODIMENT

Figure 1:
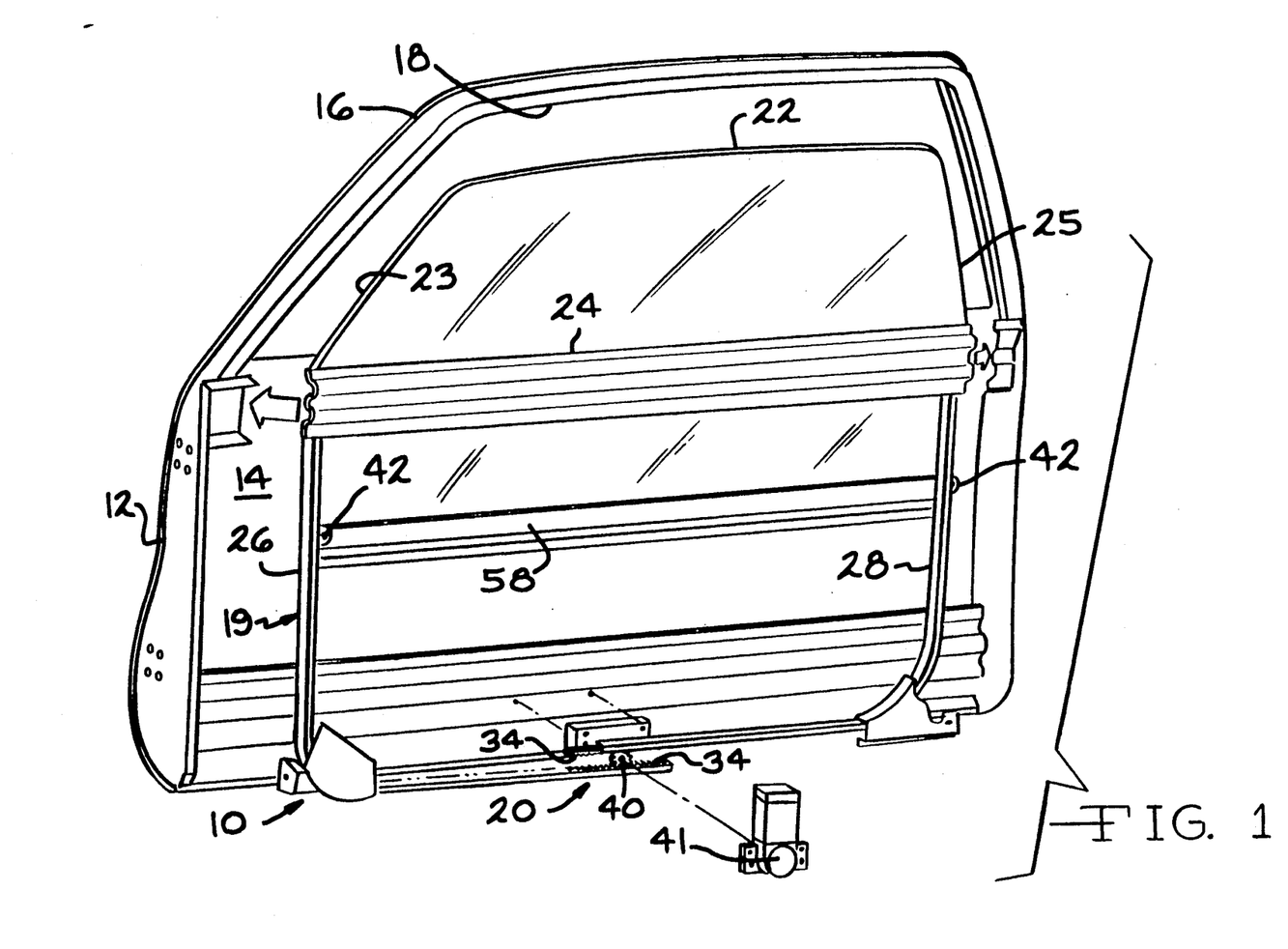
FIG. 1 is a perspective view of a vehicle door assembly having a drive window regulator mechanism with a kick-out mechanism.

The dual drive window regulator mechanism of this invention, indicated generally at 20, is shown in FIG. 1 assembled in a vehicle door assembly 10. The door assembly includes a door skin 12 having an outer sheet metal panel 14, the outer surface of which defines the exterior surface of the door. The door skin also includes a window frame 16 which defines a window opening 18.

As shown in FIG. 1, the door assembly 10 also includes a functional door cartridge 19 comprised of the window regulator mechanism 20, window glass 22 and cross member 24 being inserted into the door skin 12. It is to be understood that the regulator mechanism of this invention is not limited to use in a vehicle door assembly constructed with a functional door cartridge but can be used in conventional vehicle door assemblies.

The window regulator mechanism 20 includes a forward track 26 and a rearward track 28 which extend vertically at the forward and rearward edges 23 and 25 respectively, of the glass 22. The tracks 26 and 28 curve and extend horizontally along the lower edge of the door assembly. The two tracks 26 and 28 are hollow and define a generally rectangular shaped inner surface 29 shown in FIGS. 5 and 9. A slots 32 extends lengthwise of the tracks 26 and 28 also shown in FIGS. 5 and 9. The slot 32 in the two tracks 26 and 28 are facing rearward relative to the vehicle, to the right in FIG. 1. At the lower portion of the door assembly, where the two tracks are generally horizontal, the slots 32 in the two tracks face one another.

Figures 8, 9:
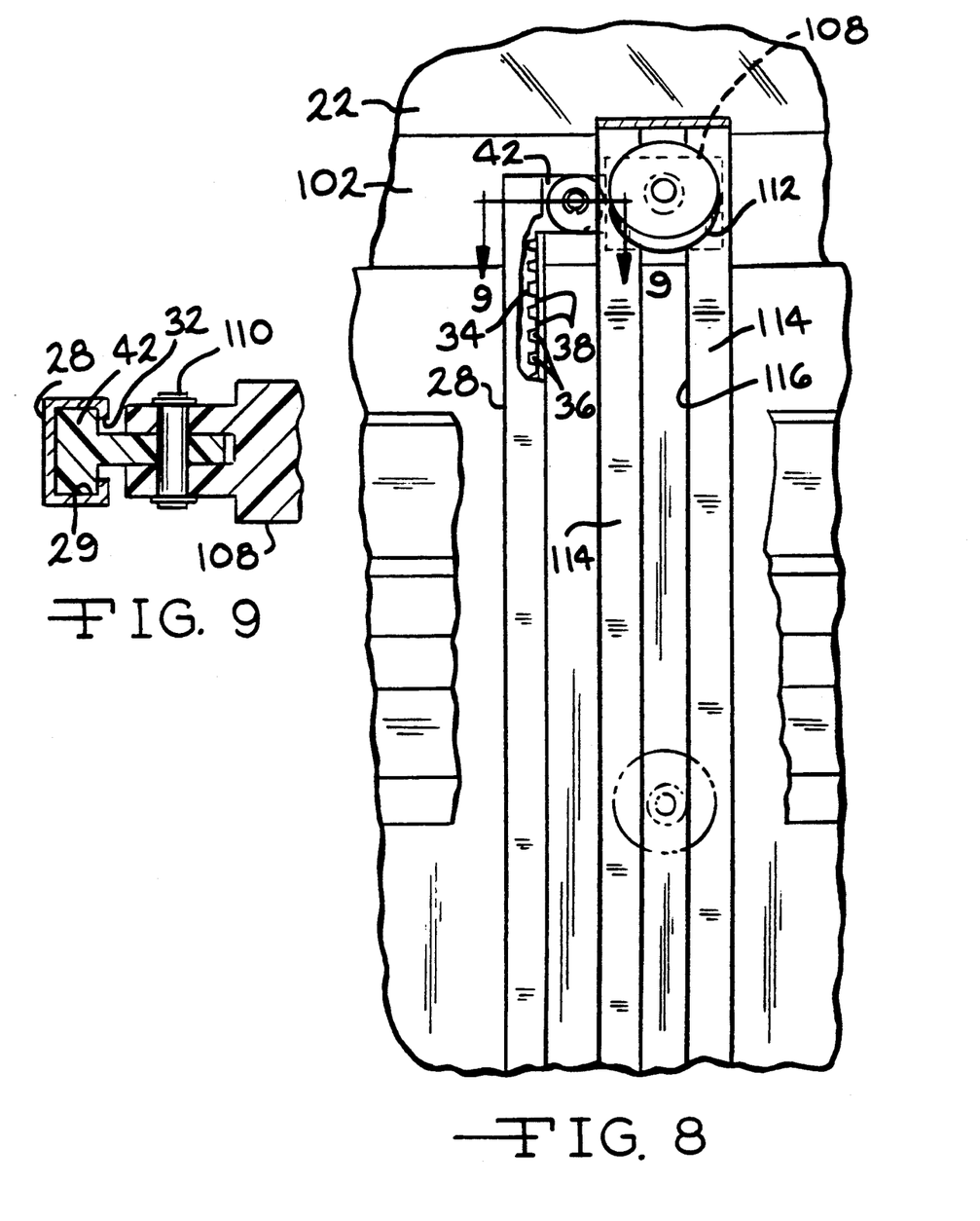
FIG. 8 is a elevational view of the kick-out mechanism of FIG. 7.
FIG. 9 is a sectional view as seen from substantially the line 9—9 of FIG. 8.

A continuous rack member 34, preferably formed of a suitable flexible plastic material which can economically manufactured, is mounted in the tracks 26 and 28. The racks 34 are of generally rectangular shape in cross section corresponding to the rectangular shape of the inner surface 29 of the tracks 26 and 28. The racks 34 are formed with transverse evenly spaced grooves 36 which cooperate to form outwardly extending teeth 38 that are located facing the continuous slots 32 in the tracks. The grooves and teeth are shown in FIG. 8. A drive pinion 40 is located at the center of the door assembly along the lower edge thereof and engages the racks 34 of both tracks 26 and 28 through the slots 32. As the drive pinion 40 is rotated by a motor 41, both racks 34 are simultaneously driven longitudinally through the tracks 26 and 28. Mounting flanges 42 are attached to the ends of the two racks 34 and extend outward through the slots 32, the function of which will be described in detail below. As the drive pinion 40 is rotated, simultaneously driving the two racks 34, the mounting flanges 42 are moved longitudinally relative to the two tracks 26 and 28.

Figure 2:
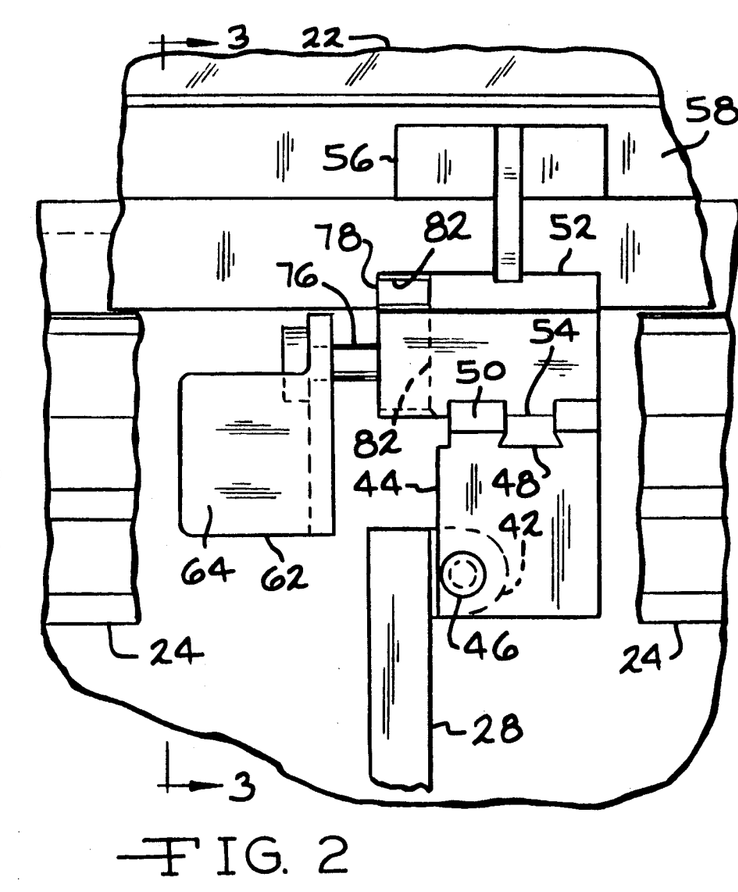
FIG. 2 is a elevational view of a window kick-out mechanism.

One embodiment of the structure that provides a window kick-out feature is shown in FIGS. 2-5. FIG. 2 is a view looking toward the vehicle door assembly from the vehicle interior showing the kick-out structure at the top of the rearward track 28 with the glass 16 in the raised position.

A lower dovetail slide block 44 is rotatably attached to the mounting flange 42 by a pin 46 extending through the lower dovetail block 44 and mounting flange 42. The lower dovetail block has a dovetail shaped groove or mortise 48 machined in its upper surface 50. An upper dovetail slide block 52 is positioned above lower dovetail block 44 and contains a dovetail shaped flaring tenon 54 for sliding within the mortise 48 of block 44. The mortise and tenon are directed longitudinally side-to-side relative to the vehicle door to allow the upper block to move outward as the glass is raised. A bracket 56 attaches the upper dovetail block 52 to a glass attaching bracket 58 extending along the lower edge of the glass 22. As the upper dovetail block 52 moves outward, the lower edge of the glass 22 moves outward from the phantom line position to the solid line position in FIG. 3.

Figure 3:
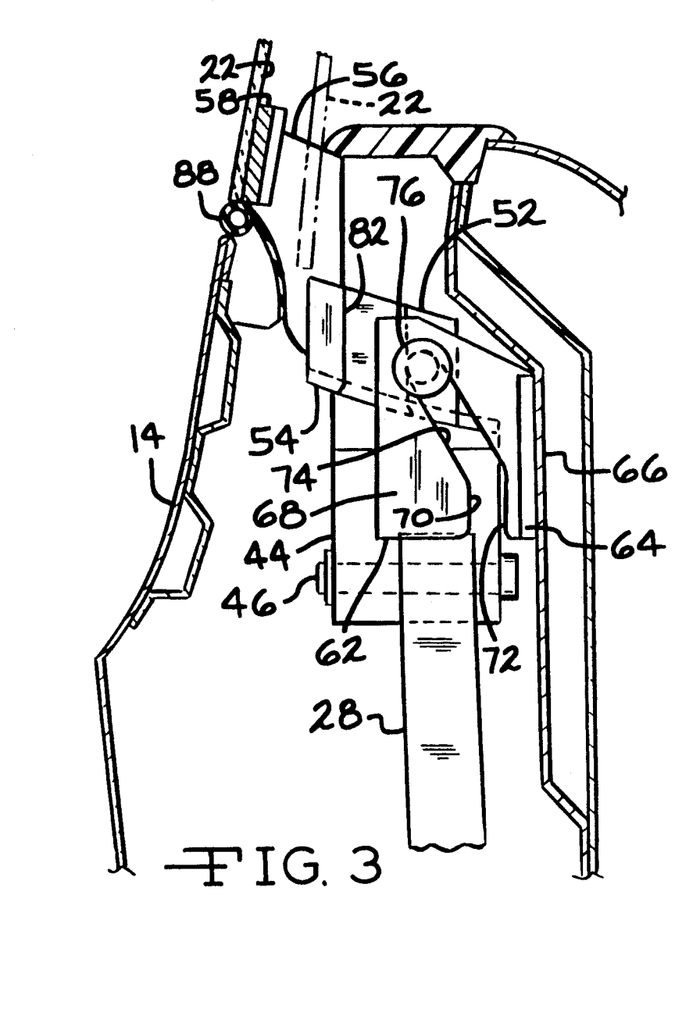
FIG. 3 is a sectional view as seen from substantially the line 3—3 of FIG. 2.

The dovetail mortise and tenon are curved upwardly concaved as shown in FIG. 3. This curve is necessary to provide for rotation of the glass 22 about an axis along the uppermost edge of the glass 22. Accordingly, the radius of curvature of the dovetail mortise and tenon is dictated by the size of the glass 22. Alternatively, the dovetail joint can be straight, as opposed to curved, and the attachment of bracket 56 to the upper dovetail block 52 can be pivoted to allow for the rotational movement of the glass.

A cam 62 is provided to move the upper dovetail block outward as the window approaches the raised position. The cam 62 is constructed of a angle member having a mounting portion 64 attached to interior member 66 of the door assembly. A cam portion 68 extends outward from the mounting portion 64 and defines a slot 70. Slot 70 includes a generally vertical lower portion 72 which parallels the track 28 and an inclined upper portion 74 which is angled upward and outward relative to the vehicle from the vertical portion 72. A pin 76 extending from the side 78 of upper dovetail block 52 engages the slot 70 as the dovetail block 52 is raised. As the pin engages the inclined portion 74 of the slot, the pin follows the slot and moves the upper block 52 outward relative to the vehicle. This moves the lower edge of the glass 22 outward to rest upon a seal 88. Seal 88 defines the lower edge of the window opening 18 immediately above the sheet metal panel 14. A second pin, extending from the lower dovetail block 44 and engaging only the vertical portion 72 of slot 70, can be provided to give greater stability to the positioning of the glass lower edge.

Figure 4:
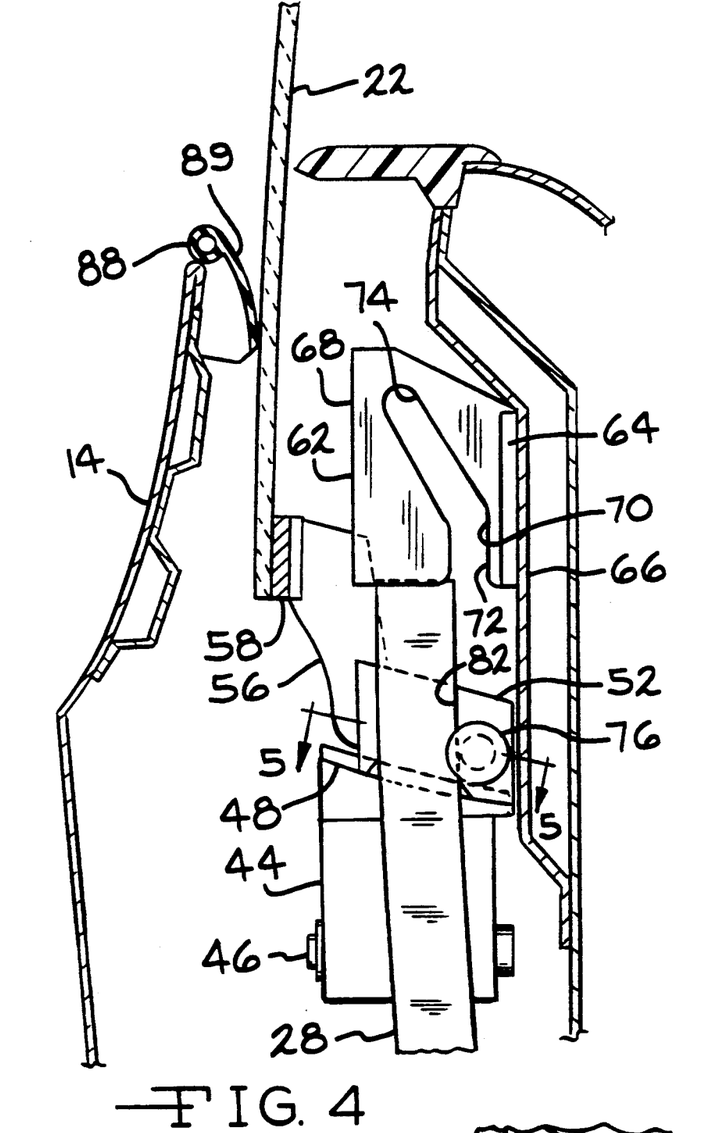
FIG. 4 is a view similar to FIG. 3 with the glass in a lowered position.

FIG. 4 is a view similar to FIG. 3 in which the glass 22 has been lowered from the uppermost position shown in FIG. 3 closing the window opening 18. The glass 22 is lowered by rotating the drive pinion 40 (FIG. 1) such that the racks 34 of tracks 26 and 28 are lowered, causing the mounting flanges 42 to move downward. As mounting flanges 42 move downward, the lower 44 and upper 52 dovetail blocks move downward resulting in lowering of the glass 22. As the dovetail blocks move downward, the inclined slot 74 guides the pin 76 of the upper dovetail block inward. This results in moving the lower edge of the glass 22 inward as it begins to move downward. As the glass 22 moves downward, the lip 89 of seal 88 wipes the outer surface of the glass and seals against the glass to prevent water from entering the door assembly interior.

Figure 5:
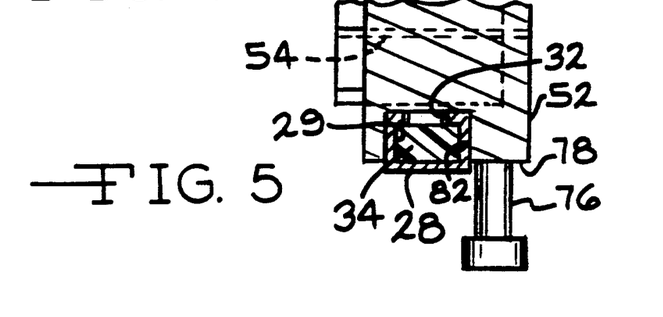
FIG. 5 is a sectional view as seen from substantially the line 5—5 of FIG. 4.

The face 78 of the upper dovetail block 52 contains a channel 82 which engages the exterior of track 28 when the dovetail block is in a lowered position as shown in FIGS. 4 and 5. The purpose of the channel 82 is to prevent relative motion between the two dovetail blocks when the glass 22 is in a lowered position where the pin 76 no longer engages slot 70. The channel 82 thus provides side-to-side stability of the glass position thereby allowing accurate placement and alignment of the glass during travel. Separate guide channels, as used in previous window regulator mechanisms to position the glass, are no longer necessary. This results in a reduction in the number of components in the door assembly and the weight of the door assembly. Identical kick-out structure is provided at both glass drive attachment locations.

Figure 6:
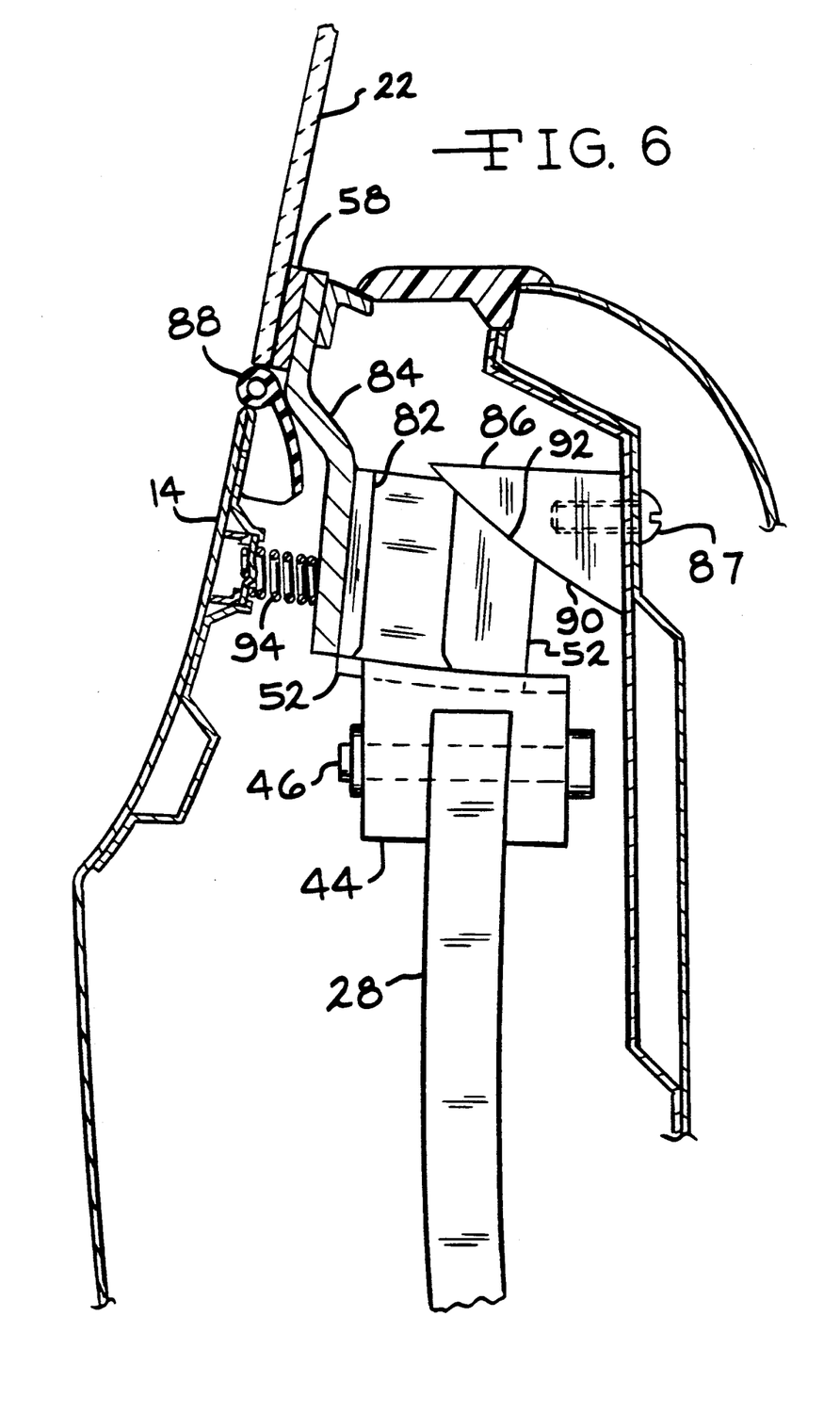
FIG. 6 is a view similar to FIGS. 3 and 4 of a second embodiment of the kick-out mechanism.

FIG. 6 shows a second embodiment of the sliding block dovetail kick-out mechanism shown in FIGS. 2-5. The cam 62 used to move the upper dovetail block outward as the window approaches the closed position has been replace by a wedge 86 attached to the door assembly by screw 87. The wedge has an inclined surface 90 which, as viewed in FIG. 6, is inclined outwardly and upwardly.

The upper dovetail block 52 has a correspondingly inclined surface 92 which engages the surface 90 of wedge 86 as the dovetail block 52 is moved upward. As the dovetail block 52 engages the wedge 86, the inclined surface forces the dovetail block to move outwardly thereby moving the glass 22 outward such that the glass lower edge is flush with the exterior surface of the door and rests upon seal 88. The surface 90 of the wedge and the engaging surface 92 of the upper dovetail block are also a curved concave upward. By curving these contact surfaces, surface contact is maintained as the upper block slides along the curved dovetail.

A spring stop comprised of a coil spring 94, is attached to the inner surface of the sheet metal panel 14 and extends inwardly toward the upper dovetail block 52. The spring 94 is of sufficient length in the uncompressed condition that the glass mounting bracket 84 attached to the dovetail block 52 will engage the end of the spring 94 simultaneously with engagement of block 52 with wedge 86. The spring 94 thus ensures continuous engagement of the inclined surfaces 92 and 90 when the glass is in the raised position. As the glass 22 is lowered, the spring 94 moves the dovetail block 52 inward thereby moving the lower edge of glass 22 inward until the channel 82 in the upper dovetail block 52 engages the track 28 as described above with respect to FIGS. 4 and 5.

Figure 7:
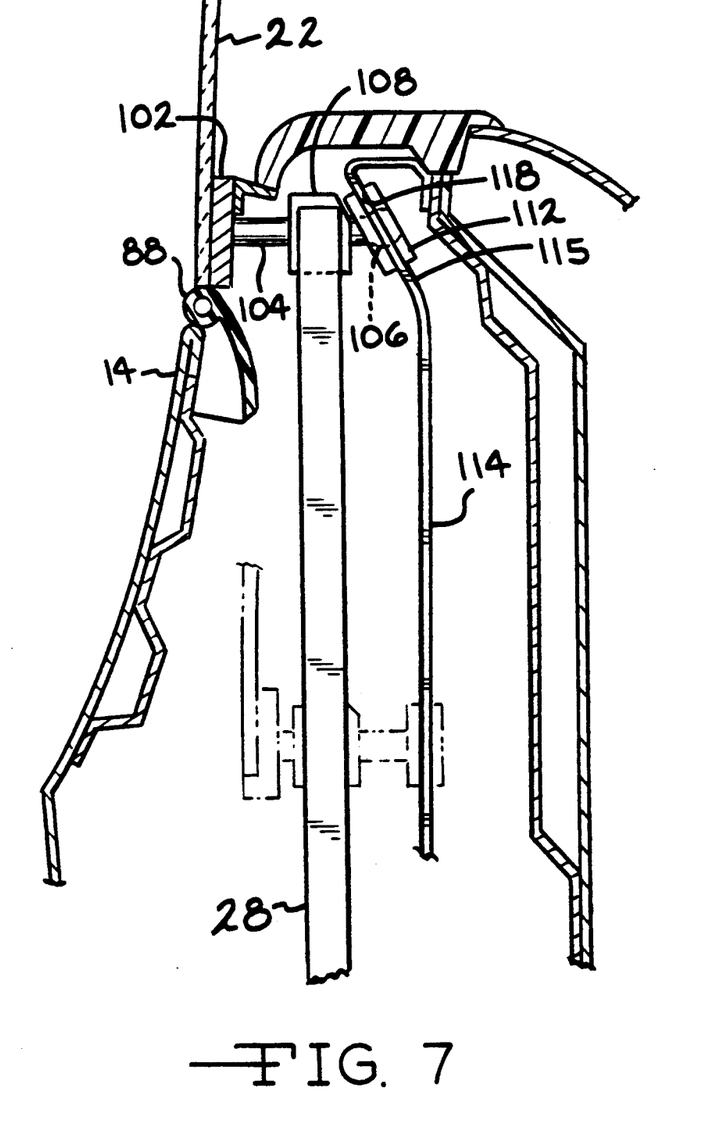
FIG. 7 is a sectional view similar to FIGS. 3 and 4 of a third embodiment of the kick-out mechanism.

A third embodiment of structure providing the kick-out feature is shown in FIGS. 7-9. The glass attaching bracket 102 is attached to the inner surface of glass 22 adjacent the lower glass edge. Bracket 102, like bracket 58, can be attached to the glass by bonding, a reaction injection molding process (RIM), or the like. The glass attaching bracket 102 has integrally formed thereon push rods 104 for attaching the glass 22 to the window regulator mechanism. Two push rods 104 are used, one at or near each edge 23 and 25 of the glass 22 at the two glass drive points. The end of push rod 104 extending away from the glass 22 forms a ball 106. Push rod 104 slides through a rod guide block 108 which in turn is attached to the mounting flange 42 by a pin 110 as shown in FIG. 9.

A circular button 112 having a central socket is mounted to the ball 106 of push rod 104 with a ball and socket joint which allows the button 112 to pivot about the ball 106. The outer periphery of the button 112 includes an annular groove 118. A flat guide rail 114 is positioned inwardly of the track 28 and is generally parallel to the track 28. The guide rail is a flat plate having a longitudinal slot 116. The button 112 is positioned within the slot 116 with the groove 118 engaging the edges of slot 116 in the guide rail. The upper end of the guide rail 114 is inclined outwardly at 115 as shown in FIG. 7.

As the rack 34 is moved upward within the track 28, the rod guide 108 also moves upward. When the rod guide reaches the upper end of travel, the button 112 enters the inclined portion of the guide rail 114. As this occurs, the button 112 pivots around the ball 106 and moves outward sliding the push rod outward through the rod guide 108. The outward motion of the push rod moves the lower edge of the glass 22 outward such that it seats upon the seal 88.

As the window is lowered from the raised position, the button 112 follows the guide rail and moves inward thus pulling the lower edge of the glass inward off the seal 88 and into the storage cavity. The lower edge of the glass and rod guide are shown in phantom lines in FIG. 7 in a lowered position.

A glass kick-out mechanism is thus provided for use with a window regulator which provides both glass guidance and glass motion without the use of separate glass guide channels. The kick-out structure moves the lower edge of the glass outward to a position flush with the vehicle exterior. The same structure used to apply forces to raise and lower the glass is also used to move the lower edge of the glass outward as the glass approaches the upper position.

It is to be understood that the invention is not limited to the exact construction illustrated and described above, but that various changes and modifications may be made without departing from the spirit and scope of the invention as defined in the following claims.

What is claimed is:

1. In a vehicle door assembly having an outer surface, a generally vertical window opening and a storage cavity beneath the window opening, a generally vertical window glass having fore and aft upright edges, a top edge and a bottom edge, said glass being movable between an upper position closing the window opening and a lower position stored within the storage cavity, a window regulator mechanism comprising:

drive means disposed within said storage cavity and operable to move the glass along a generally upright path of movement between said upper and lower positions; and means for attaching said drive means to said glass at two horizontally spaced locations adjacent the bottom edge of said glass so that forces are applied to the glass at said two locations for moving the glass between said upper and lower positions, said attaching means including at each spaced location a first member fixed to said drive means, a second member fixed to said glass and means coupling said first and second members together for motion of said second member relative to said first member; and means disposed within said storage cavity for guiding said glass along said path of movement between said upper and lower positions, said path including movement of the bottom edge of the glass outward toward the outer surface of the door assembly during upward movement of the glass as the glass approaches and is moved into said upper position, said guide means engaging said second member to guide said glass along said path whereby said guide means acts upon said glass through said attaching means, said guide means including coacting guide and follower means acting on said attaching means second member to move the bottom edge of said glass outward toward said outer surface of the door assembly during upward movement of said glass as the glass approaches and is moved into said upper position, said guide means further including an upright member having a longitudinally extending slot therein, said follower means including a follower mounted to said attaching means second member and disposed within said slot for motion therein as said glass is raised and lowered, said upright member and slot being inclined outwardly at the upper end of said slot so as to move said attaching means second member and said glass bottom edge outward as said glass approaches and is moved into said upper position.

2. In a vehicle door assembly having an outer surface, a generally vertical window opening and a storage cavity beneath the window opening, a generally vertical window glass having fore and aft upright edges, a top edge and a bottom edge, said glass being movable between an upper position closing the window opening and a lower position stored within the storage cavity, a window regulator mechanism comprising:

drive means disposed within said storage cavity and operable to move the glass along a generally upright path of movement between said upper and lower positions;

means for attaching said drive means to said glass at two horizontally spaced locations adjacent the bottom edge of said glass so that forces are applied to the glass at said two locations for moving the glass between said upper and lower positions, said attaching means including at each spaced location a first member fixed to said drive means, a second member fixed to said glass and means coupling said first and second members together for motion of said second member relative to said first member; and means disposed within said storage cavity for guiding said glass along said path of movement between said upper and lower positions, said path including movement of the bottom edge of the glass outward toward the outer surface of the door assembly during upward movement of the glass as the glass approaches and is moved into said upper position, said guide means engaging said second member to guide said glass along said path whereby said guide means acts upon said glass through said attaching means, said drive means including a pair of generally vertical hollow track members disposed within said cavity, one of said track members being adjacent each upright edge of the glass, a pair of drive members each operatively associated with one of said track members for vertical sliding motion within said track members, means for simultaneously moving both said drive members vertically in the same direction, said attaching means attaching said glass to said drive members at said two horizontally spaced locations whereby said glass is moved vertically in response to movement of said drive members, and said guide means operable to move the bottom edge of the glass outward including a guide and follower associated with said attaching means for moving said attaching means outward during upward movement of the glass as the glass approaches and is moved into said upper position, said attaching means second member includes a pair of push rods attached to said glass and extending inwardly from said glass, one push rod attached to said glass at each of said two horizontally spaced locations, said attaching means first member including a pair of drive blocks with one drive block attached to each drive member, said push rods slideably extending through bores in said drive blocks whereby as said drive members are moved, said drive blocks move said push rods and said glass, said guide means including a pair of upright members, one adjacent each of said vertical tracks, said upright members having a longitudinally extending slot therein, said upright members and slots being inclined outwardly at the upper end of said slots, and a follower mounted to each of said push rods and disposed within said slots so that as said glass is raised to the upper position, said upright member guide said push rods and glass bottom edge outward as the push rods slide through said drive blocks.

* * * * *